US011436745B1

(12) United States Patent
Sun et al.

(10) Patent No.: US 11,436,745 B1
(45) Date of Patent: Sep. 6, 2022

(54) RECONSTRUCTION METHOD OF THREE-DIMENSIONAL (3D) HUMAN BODY MODEL, STORAGE DEVICE AND CONTROL DEVICE

(71) Applicant: INSTITUTE OF AUTOMATION, CHINESE ACADEMY OF SCIENCES, Beijing (CN)

(72) Inventors: Zhenan Sun, Beijing (CN); Hongwen Zhang, Beijing (CN); Wanli Ouyang, Beijing (CN); Jie Cao, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/629,373

(22) PCT Filed: Oct. 22, 2019

(86) PCT No.: PCT/CN2019/112550
§ 371 (c)(1),
(2) Date: Jan. 22, 2022

(87) PCT Pub. No.: WO2021/077295
PCT Pub. Date: Apr. 29, 2021

(30) Foreign Application Priority Data

Oct. 21, 2019 (CN) .......................... 201910999200.5

(51) Int. Cl.
*G06T 7/00* (2017.01)
*G06T 7/55* (2017.01)
*G06T 17/10* (2006.01)

(52) U.S. Cl.
CPC ................ *G06T 7/55* (2017.01); *G06T 17/10* (2013.01); *G06T 2207/10004* (2013.01);
(Continued)

(58) Field of Classification Search
CPC .. G06T 7/55; G06T 17/10; G06T 2207/10004; G06T 2207/20081; G06T 2207/20084; G06T 2207/30196
See application file for complete search history.

(56) References Cited

U.S. PATENT DOCUMENTS

| 2019/0278983 | A1 | 9/2019 | Iqbal et al. |
| 2019/0371080 | A1* | 12/2019 | Sminchisescu ......... G06T 13/40 |
| 2020/0387706 | A1* | 12/2020 | Zur ....................... G06T 7/0012 |

FOREIGN PATENT DOCUMENTS

| CN | 108921926 A | 11/2018 |
| CN | 109508678 A | 3/2019 |
| CN | 110136243 A | 8/2019 |

OTHER PUBLICATIONS

Wei Wei, et al., Articulation Points Extraction without Manual Intervention and 3D Reconstruction, Computer Science, 2013, pp. 292-294, vol. 40, No. 4.

* cited by examiner

*Primary Examiner* — Ping Y Hsieh
(74) *Attorney, Agent, or Firm* — Bayramoglu Law Offices LLC

(57) ABSTRACT

A reconstruction method of a three-dimensional (3D) human body model includes: acquiring, by a fully convolutional network (FCN) module, a global UVI map and a local UVI map of a body part according to a human body image (S1); estimating, by a first neural network, a camera parameter and a shape parameter of the human body model based on the global UVI map (S2); extracting, by a second neural network, rotation features of joints of a human body based on the local UVI map (S3); refining, by using a position-aided feature refinement strategy, the rotation features of the joints of the human body to acquire refined rotation features (S4); and estimating, by a third neural network, a pose
(Continued)

parameter of the human body model based on the refined rotation features (S5). The reconstruction method achieves accurate and efficient reconstruction of the human body model, and improves robustness of pose estimation.

20 Claims, 6 Drawing Sheets

(52) U.S. Cl.
CPC ............... *G06T 2207/20081* (2013.01); *G06T 2207/20084* (2013.01); *G06T 2207/30196* (2013.01)

RECONSTRUCTION METHOD OF THREE-DIMENSIONAL (3D) HUMAN BODY MODEL, STORAGE DEVICE AND CONTROL DEVICE

CROSS REFERENCE TO THE RELATED APPLICATIONS

This application is the national phase entry of International Application No. PCT/CN2019/112550, filed on Oct. 22, 2019, which is based upon and claims priority to Chinese Patent Application No. 201910999200.5, filed on Oct. 21, 2019, the entire contents of which are incorporated herein by reference.

TECHNICAL FIELD

The present invention relates to the technical field of human body model reconstruction, and more particularly to a reconstruction method of a three-dimensional (3D) human body model, a storage device and a control device.

BACKGROUND

As one of many crucial tasks of 3D computer vision, a 3D human body model reconstruction aims to quickly and accurately reconstruct a parameterized 3D human body model (including shape and pose parameters) from a human body image.

In the existing 3D human body model reconstruction technology, the traditional model-based fitting methods usually deform the 3D human body model iteratively, such that the model is re-projected to match the two-dimensional (2D) image information such as joint positions or human body silhouettes. These methods are usually time-consuming and sensitive to the initial values of model parameters. The emerging learning-based methods directly extract features from the image and estimate model parameters through neural networks. These methods improve the shape and pose estimation accuracy of the model, but they still have problems such as misalignment between the reconstruction result of the 3D model and the 2D image. The misalignment mainly arises from the following two factors. (1) There is a highly non-linear mapping relationship between the image and the model parameters. (2) The pose of the 3D human body model is usually expressed by a relative rotation amount of the joints, making the re-projection of the model reconstruction result on the 2D image prone to position drift.

SUMMARY

In order to solve the above-mentioned problems of the prior art, the present invention proposes a reconstruction method of a 3D human body model, a storage device and a control device, which improve the accuracy and efficiency of model reconstruction.

A first aspect of the present invention proposes a reconstruction method of a 3D human body model, and the method includes:

acquiring, by a pre-trained fully convolutional network (FCN) module, a global UVI map and a local UVI map of a body part according to a human body image;

estimating, by a first neural network, a camera parameter and a shape parameter of the human body model based on the global UVI map;

extracting, by a second neural network, rotation features of joints of a human body based on the local UVI map;

refining, by using a position-aided feature refinement strategy, the rotation features of the joints of the human body to acquire refined rotation features; and estimating, by a third neural network, a pose parameter of the human body model based on the refined rotation features.

Preferably, the UVI map may include a U coordinate map, a V coordinate map and an I index map;

where, U coordinates and V coordinates may respectively show coordinates of the 3D human body model in a U texture space and a V texture space, and an I index may show an index of each body part.

Preferably, the FCN module may include: a first FCN, a second FCN, a third FCN and a fourth FCN; and correspondingly, the step of acquiring, by the pre-trained FCN module, the global UVI map and the local UVI map of the body part according to the human body image includes:

extracting, by the first FCN, a global feature map based on the human body image;

predicting, by the second FCN, the corresponding global UVI map based on the global feature map; and generating, by the third FCN, a heat map of joint positions of the human body based on the global feature map to acquire the joint positions;

calculating affine transformation parameters corresponding to the joints based on the joint positions;

performing affine transformation on the global feature map based on the affine transformation parameters of the joints to acquire a local feature map of the joints; and predicting, by the fourth FCN, the corresponding local UVI map based on the local feature map.

Preferably, the step of calculating the affine transformation parameters corresponding to the joints based on the joint positions may include: calculating the affine transformation parameters corresponding to the joints according to the following formulas:

$$s_k = \alpha \max(|j_{p(k)} - j_k|_2, |j_{p(k)} - j_{c(k)}|_2)$$

$$r_k = \cos^{-1} \frac{(j_{p(k)} - j_k) \cdot e_\perp}{|j_{p(k)} - j_k|_2}$$

$$c_k = j_k$$

where, affine transformation parameters of a k-th joint may include: a scale parameter $s_k$, a rotation parameter $r_k$ and a translation parameter $c_k$; $\alpha$ may represent a preset constant; $e_1$ may represent a vertical downward unit vector; $j_k$ may represent a position coordinate of the k-th joint; p(k) may be used to return a parent joint index of the k-th joint; and c(k) may be used to return a child joint index of the k-th joint.

Preferably, the step of refining, by using the position-aided feature refinement strategy, the rotation features of the joints of the human body to acquire the refined rotation features may include:

collecting, by a first graph convolutional network (GCN), the rotation features of the joints of the human body along a kinematic chain, and transforming the rotation features of the joints of the human body into a position feature space to acquire position features;

refining, by a second GCN, the position features based on spatial structure information between different joints to acquire refined position features; and collecting, by a third GCN, the refined position features, and transforming the refined position features into a rotation feature space to acquire the refined rotation features.

Preferably, during training, a neural network may regress position coordinates of the joints of the human body model from the position features and the refined position features, and regress the pose parameter of the joints of the human body model from the rotation features and the refined rotation features.

Preferably, an adjacency matrix $A^1$ of the first GCN may be constructed as follows:

if a j-th joint is one of ancestor joints of an i-th joint, then $A_{ij}^1=1$; and otherwise, $A_{ij}^1=0$, where $A_{ij}^1$ may represent an element located in an i-th row and a j-th column in the adjacency matrix $A^1$.

Preferably, an adjacency matrix $A^2$ of the second GCN may be constructed as follows:

if a i-th joint and an j-th joint are connected or i=j, then $A_{ij}^2=1$; and otherwise $A_{ij}^2=0$, where $A_{ij}^2$ may represent an element located in an i-th row and a j-th column in the adjacency matrix $A^2$.

Preferably, an adjacency matrix $A^3$ of the third GCN may be constructed as follows:

if a j-th joint is a parent or child joint of an i-th joint or i=j, then $A_{ij}^3=1$; and otherwise, $A_{ij}^3=0$, where $A_{ij}^3$ may represent an element located in an i-th row and a j-th column in the adjacency matrix $A^3$.

Preferably, the human body model may be a parameterized deformation model, and the human body may include the shape parameter and the pose parameter;

where, the shape parameter may denote shape information of the human body model, and the pose parameter may denote a rotation amount of each of the joints of the human body model relative to a parent joint.

Preferably, the method may further include:

reconstructing the 3D human body model based on the camera parameter, and the shape parameter of the human body model and the pose parameter of the human body model.

Preferably, the human body model may include a preset number of joints; and the second neural network may include a preset number of branch networks, respectively corresponding to the preset number of joints; and each of the branch networks may be used to extract a rotation feature of a corresponding joint.

A second aspect of the present invention proposes a storage device, storing a plurality of programs, where the programs are configured to be loaded and executed by a processor to implement the above reconstruction method of a 3D human body model.

A third aspect of the present invention proposes a control device, including: a processor and a memory, where the processor is configured to load a program, and the memory is configured to store the program; and the program is configured to be loaded and executed by the processor to implement the above reconstruction method of a 3D human body model.

Compared with the closest prior art, the present invention has the following beneficial effects:

(1) The present invention uses the UVI maps as an intermediate expression to effectively assist the neural network in learning the nonlinear mapping relationship between the image and the model. The UVI maps establish a dense relationship between the 2D image and the 3D model, which retains the relevant information about the shape and pose of the human body, while excluding irrelevant information such as background, clothing and lighting changes. Therefore, the neural network can efficiently reconstruct the human body model.

(2) The present invention adopts a global and local decoupling design to make the prediction task efficient and accurate. The parameters of the 3D human body model are divided into shape and pose parameters. The shape parameter describes the height, weight and other global information of the human body model, and the pose parameter describes the relative rotation state of the joints of the human body. The present invention uses different branch networks in the second neural network to predict the rotation features of different joints, which greatly improves the accuracy of model reconstruction.

(3) The present invention adopts a position-aided rotation feature refinement strategy to make the pose estimation of the model robust. If the pose of the 3D human body model is expressed in a rotation-based manner, the model reconstruction result is prone to drift in position. The present invention adopts the position-aided rotation feature refinement strategy and effectively utilizes the spatial structure relationship between the joints of the human body, thereby improving the robustness of pose estimation.

DETAILED DESCRIPTION OF THE EMBODIMENTS

The preferred implementations of the present invention are described below with reference to the drawings. Those skilled in the art should understand that the implementations herein are merely intended to explain the technical principles of the present invention, rather than to limit the protection scope of the present invention.

It should be noted that in the description of the present invention, terms such as "first" and "second" are merely intended to facilitate description, rather than to indicate or imply relative importance of the apparatus, elements or parameters. Therefore, these terms should not be construed as a limitation to the present invention.

A human body model is a parameterized deformation model, and the human body model includes a shape parameter and a pose parameter. The shape parameter denotes shape information (such as height and weight) of the human body model, and the pose parameter denotes a pose state of the joints of the human body model, that is, a rotation amount of the joints of the human body model relative to a parent joint. The task of 3D human body model reconstruction is to estimate model parameters (including the shape parameter and pose parameter) and a camera parameter.

Figure 1:
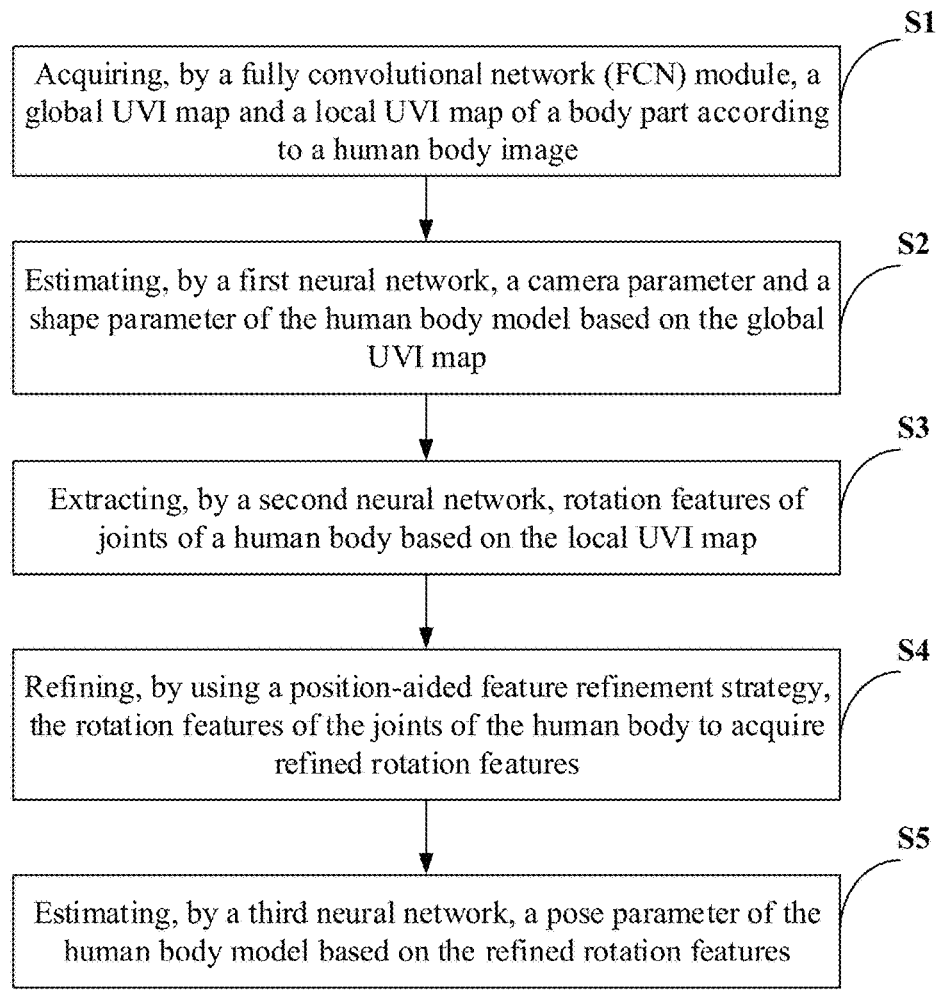
FIG. 1 is a flowchart of a reconstruction method of a 3D human body model according to an embodiment of the present invention.

FIG. 1 is a flowchart of a reconstruction method of a 3D human body model according to an embodiment of the present invention. As shown in FIG. 1, the reconstruction method of a 3D human body model in this embodiment includes steps S1 to S6.

S1: Acquire, by a FCN module, a global UVI map and a local UVI map of a body part according to a human body image. The FCN module includes: a first FCN, a second FCN, a third FCN and a fourth FCN. This step may specifically include steps S11 to S16.

S11: Extract, by the first FCN, a global feature map based on the human body image.

S12: Predict, by the second FCN, the corresponding global UVI map based on the global feature map.

S13: Generate, by the third FCN, a heat map of joint positions of the human body based on the global feature map to acquire the joint positions.

S14: Calculate affine transformation parameters corresponding to the joints based on the joint positions. In this embodiment, the parameters are expressed by Eqs. (1) to (3) below:

$$s_k = \alpha \max(|j_{p(k)} - j_k|_2, |j_{p(k)} - j_{c(k)}|_2) \quad (1)$$

$$r_k = \cos^{-1} \frac{(j_{p(k)} - j_k) \cdot e_\perp}{|j_{p(k)} - j_k|_2} \quad (2)$$

$$c_k = j_k \quad (3)$$

where, affine transformation parameters of a k-th joint include: a scale parameter $s_k$, a rotation parameter $r_k$ and a translation parameter $c_k$; $\alpha$ represents a preset constant; $e_1$ represents a vertical downward unit vector; $j_k$ represents a position coordinate of the k-th joint; p(k) is used to return a parent joint index of the k-th joint; and c(k) is used to return a child joint index of the k-th joint.

Specifically, the translation parameter enables the center of the local UVI map to be located at each joint; the rotation parameter enables the joint and its parent joint in the local UVI map to have the same orientation; and the scale parameter enables the scaling of the local UVI map to be adjusted according to the size of different body parts.

In the affine transformation, the network uses assorted sizes of receptive fields to estimate the poses of different body parts. Therefore, the pose perception of each part can be adjusted adaptively according to the size of the part, so as to achieve accurate pose estimation.

S15: Perform affine transformation on the global feature map based on the affine transformation parameters of the joints to acquire a local feature map of the joints.

S16: Predict, by a fourth FCN, the corresponding local UVI map based on the local feature map.

In the embodiment of the present invention, the UVI map includes a U coordinate map, a V coordinate map and an I index map, where, U coordinates and V coordinates respectively show coordinates of the 3D human body model in a U texture space and a V texture space, and an I index shows an index of each body part. The UVI maps establish a dense relationship between the 2D image and the 3D model. This relationship retains the relevant information about the shape and pose of the human body, while excluding irrelevant information such as background, clothing and lighting changes, thereby efficiently aiding the model parameter estimation task of the network.

Figure 2:
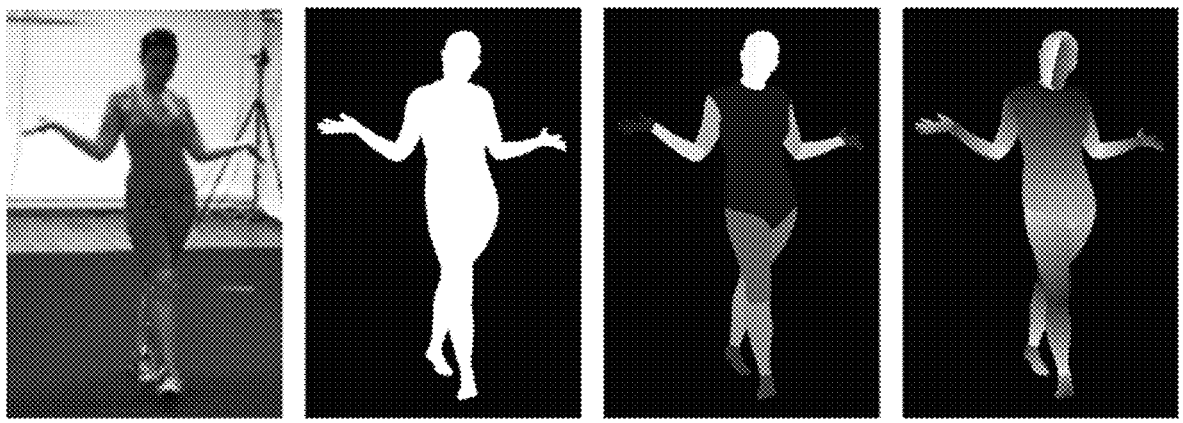
FIG. 2 shows a comparison of a human body image, a human body silhouette, a part segmentation result and a global UVI map according to an embodiment of the present invention.

FIG. 2 shows a comparison of a human body image, a human body silhouette, a part segmentation result and a global UVI map according to an embodiment of the disclosure. As shown in FIG. 2, the four pictures are the human body image, the human body silhouette, the part segmentation result and the global UVI map in sequence from left to right. The UVI map reflects the shape and pose of the human body very intuitively.

Figure 3A:
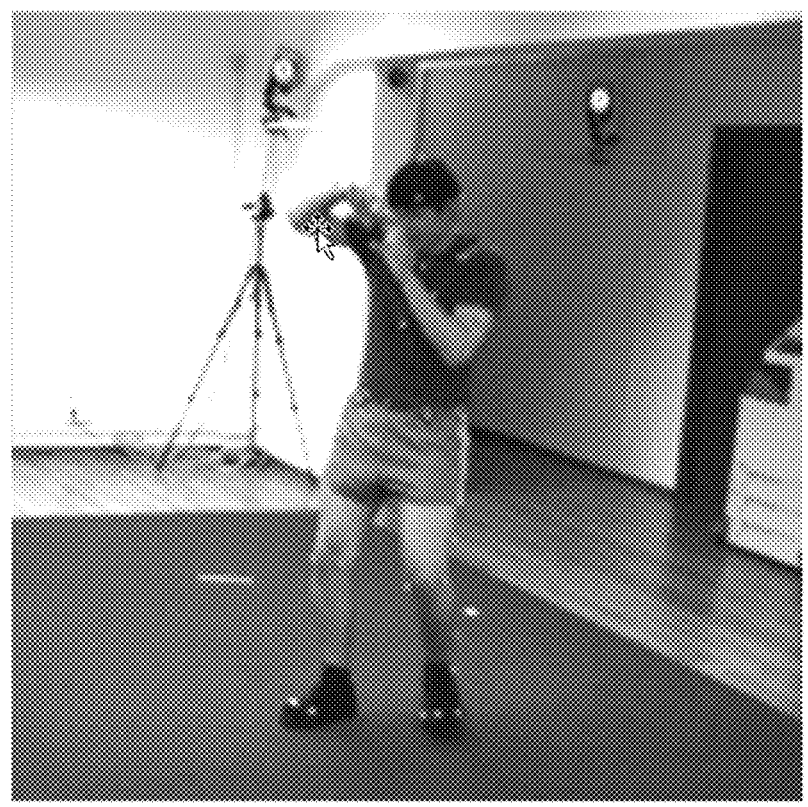
FIGS. 3(a)-3(b) show a comparison of a human body image, a global UVI map and a local UVI map according to an embodiment of the present invention, where FIGS. 3(a), 3(b) and 3(c) respectively show the human body image, the global UVI map and the local UVI map.
Figure 3B:
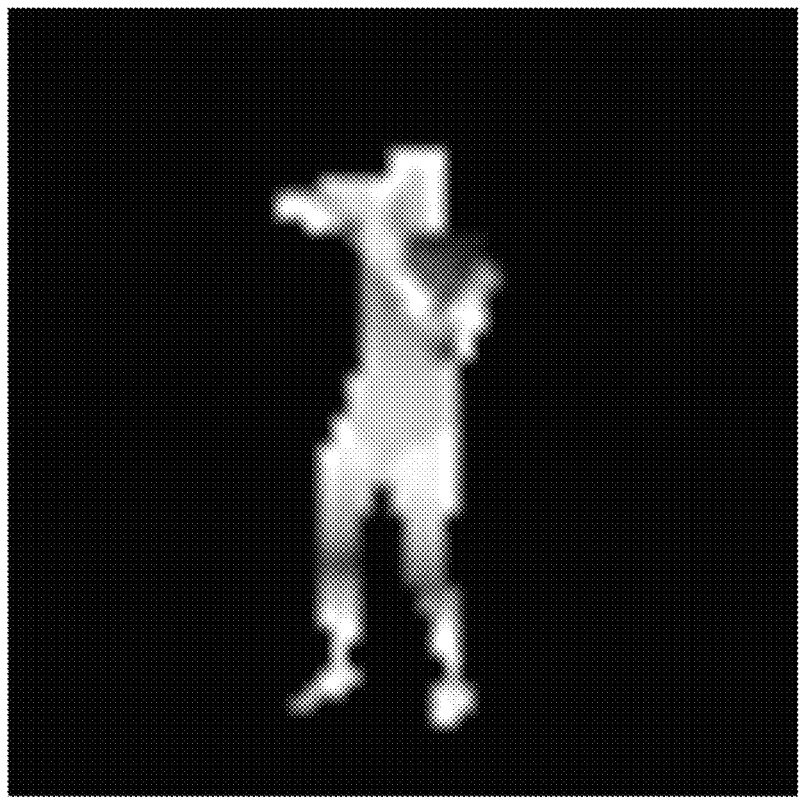
Figure 3C:
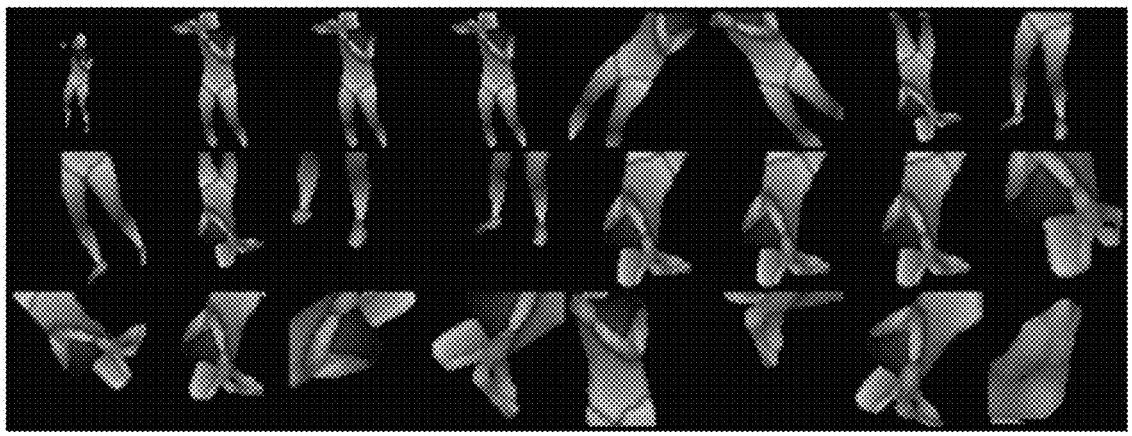

It should be noted that the global UVI map is semantically aligned with the input image after upsampling, and the center point of the local UVI map is a joint position of the human body. FIGS. 3(a)-3(b) show a comparison of a human body image, a global UVI map and a local UVI map according to an embodiment of the present invention. As shown in FIGS. 3(a)-3(b), FIG. 3(a) is an example of human body image, FIG. 3(b) is an example of global UVI map corresponding to the human body image in FIG. 3(a), and FIG. 3(c) is an example of local UVI map corresponding to the human body image in FIG. 3(a).

Figure 4:
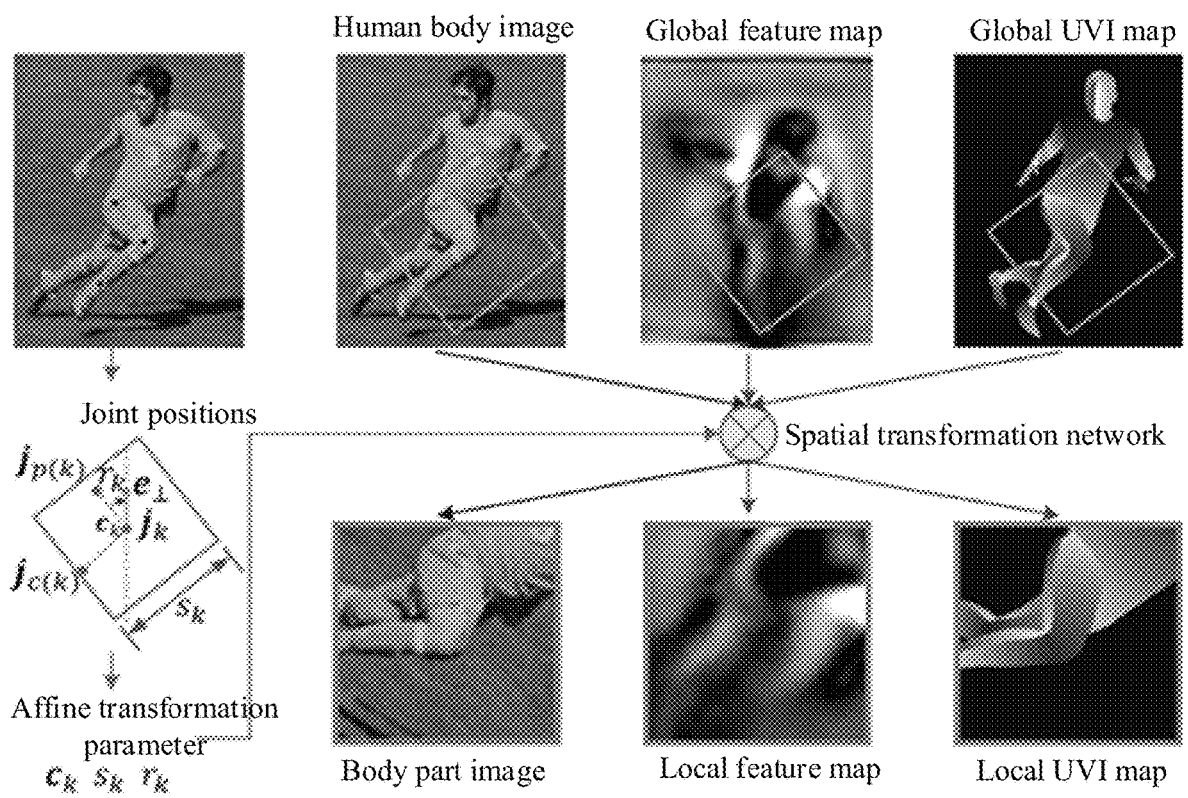
FIG. 4 shows examples before and after affine transformation of a human body image, a feature map and a UVI map according to an embodiment of the present invention.

FIG. 4 shows examples before and after affine transformation of a human body image, a feature map and a UVI map according to an embodiment of the present disclosure. As shown in FIG. 4, the affine transformation in this embodiment can be completed by using spatial transformer networks (STNs). In FIG. 4, the upper human body image, global feature map and global UVI map show images before affine transformation, and the lower human body part image, local feature map and local UVI map show images after affine transformation, which correspond to those in the square frames of the upper human body image, global feature map and global UVI map (images of the knee joint and its surroundings). The first human body image on the top left marks the positions of the knee joint and its parent joint (hip joint) and child joint (ankle joint). The meanings of the parameters in Eqs. (1) to (3) are shown directly below the first human body image. The square frame is used to capture the area surrounding the knee joint in the human body image. The center point of the square represents the knee joint ($c_k$ and $j_k$). The point on the upper left of the center point represents the hip joint $j_{p(k)}$, and the point on the lower left of the center point represents the ankle joint $j_{c(k)}$. $r_k$ is a rotation amount between the hip joint and the knee joint relative to a vertical upward line, $s_k$ is a side length of the square, and $e_1$ represents a vertical downward unit vector. Based on the joints $j_{p(k)}$, $j_k$ and $j_{c(k)}$, the affine transformation parameters $c_k$, $s_k$ and $r_k$ are calculated according to Eqs. (1) to (3). Then, a spatial transformation network transforms the upper human body image, global feature map and global UVI map in FIG. 4 according to the affine transformation parameters to acquire the lower human body part image, local feature map and local UVI map in FIG. 4. It should be noted that the affine transformation of the human body image in FIG. 4 is only used as a visualization example for ease of understanding, rather than as a method step involved in the present disclosure. The global UVI map and the local UVI map in FIG. 4 are generated by real values rather than predicted by the network. The local UVI map acquired by the spatial transformation network will supervise and train the local UVI map predicted by the network.

It should be noted that, in this embodiment, the FCN used to predict the global and local UVI maps in step S1 may be pre-trained during training, and then mixed with other networks in subsequent steps. In this way, other networks in the subsequent steps can get a more ideal UVI map as input at the beginning of training, thereby making the training process more stable.

S2: Estimate, by a first neural network, a camera parameter and a shape parameter of the human body model based on the global UVI map.

S3: Extract, by a second neural network, rotation features of the joints of the human body based on the local UVI map.

Figure 5:
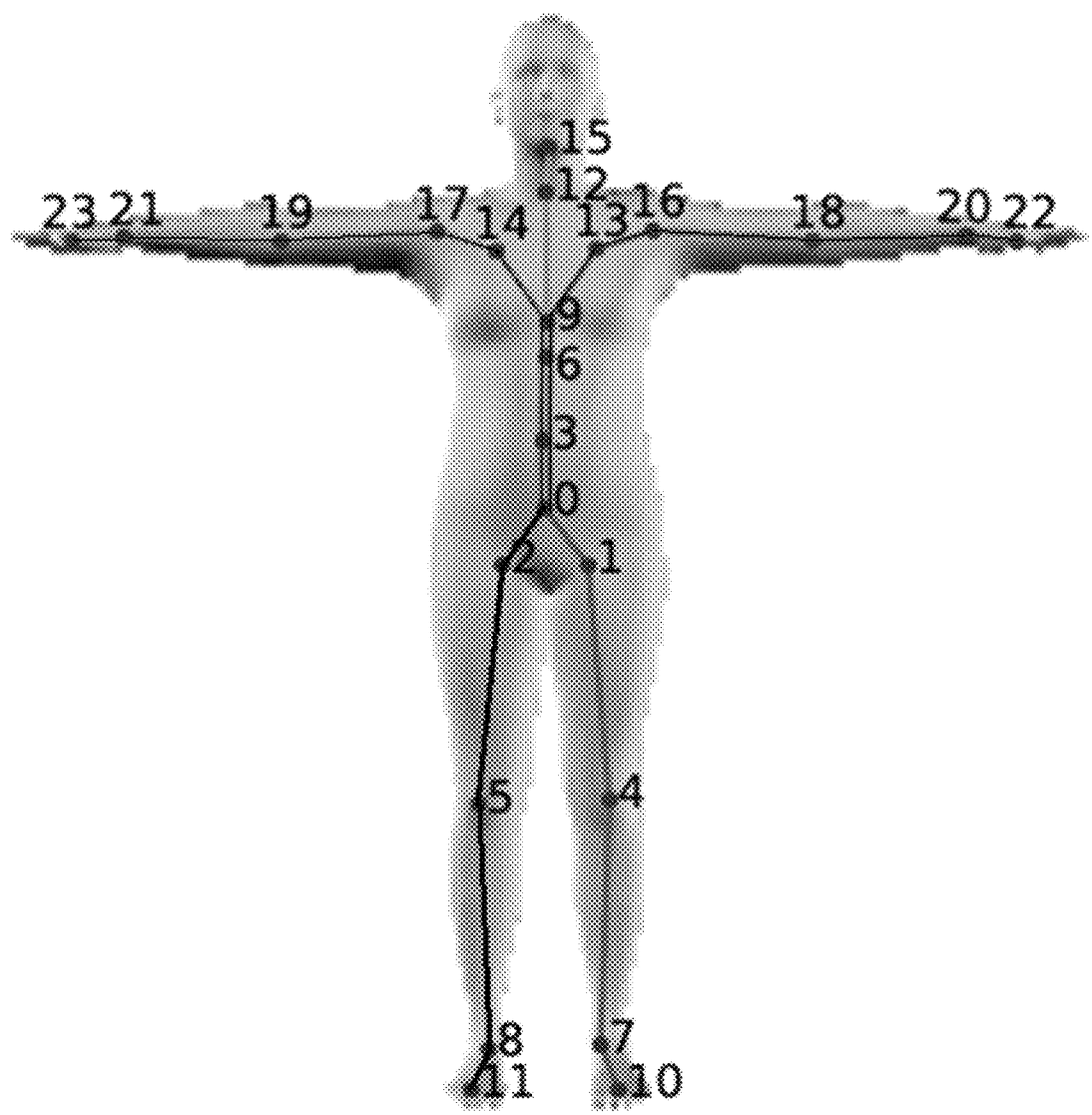
FIG. 5 shows a tree structure composed of various joints of a human body model according to an embodiment of the present invention.

The human body model includes a preset number (such as 24) of joints. Correspondingly, the second neural network includes a preset number of branch networks, respectively corresponding to the preset number of joints. Each of the branch networks is used to extract a rotation feature of a corresponding joint. FIG. 5 shows a tree structure composed of various joints of a human body model according to an embodiment of the present invention. As shown in FIG. 5, in this embodiment, 24 joints need to be extracted. Correspondingly, the second neural network includes 24 different branch networks, respectively corresponding to 24 different joints. Different branch networks are used to predict the rotation features of different joints, which significantly improves the accuracy of model reconstruction.

S4: Refine, by using a position-aided feature refinement strategy, the rotation features of the joints of the human body to acquire refined rotation features. This step may specifically include steps S41 to S43.

S41: Collect, by a first GCN, the rotation features of the joints of the human body along a kinematic chain, and transform the rotation features of the joints of the human body into a position feature space to acquire position features.

S42: Refine, by a second GCN, the position features based on spatial structure information between different joints to acquire refined position features.

S43: Collect, by a third GCN, the refined position features, and transforming the refined position features into a rotation feature space to acquire the refined rotation features.

Specifically, during training, a neural network regresses position coordinates of the joints of the human body model from the position features and the refined position features.

Specifically, during training, the neural network regresses the pose parameter (namely relative rotation amount) of the joints of the human body model from the rotation features and the refined rotation features.

Figure 6A:
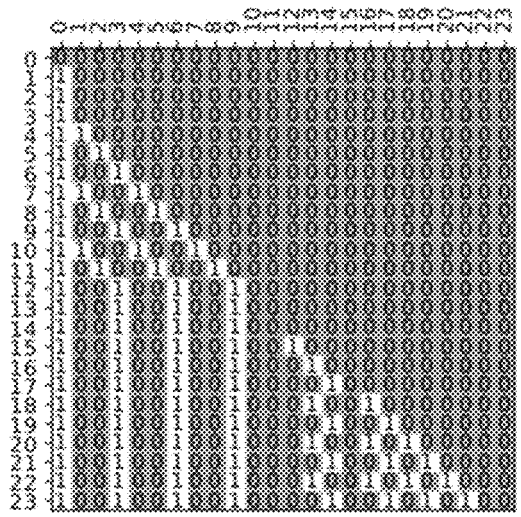
FIGS. 6(a)-6(b) show adjacency matrices of GCNs according to an embodiment of the present invention, where FIGS. 6(a), 6(b) and 6(c) respectively show adjacency matrices of a first GCN, a second GCN and a third GCN.
Figure 6B:
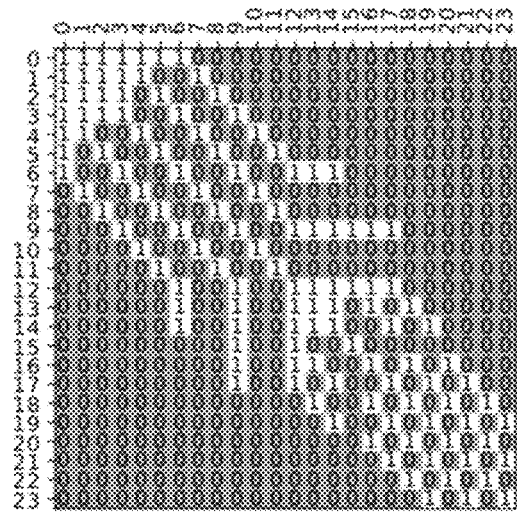
Figure 6C:
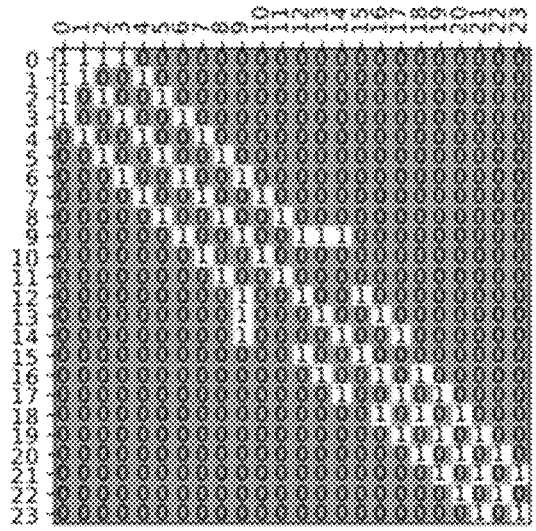

FIGS. 6(a)-6(b) show adjacency matrices of GCNs according to an embodiment of the present invention, where FIGS. 6(a), 6(b) and 6(c) respectively show adjacency matrices of the first GCN, the second GCN and the third GCN.

Specifically, the first GCN may be expressed by Eq. (4):

$$Z_{out} = \sigma(\hat{A}^1 Z_{in} W^1) \quad (4)$$

Among them, $Z_{in}$ and $Z_{out}$ are input and output features, $\hat{A}^1$ is a normalized adjacency matrix, $W^1$ is a weight of a learnable convolution kernel, and $\sigma(\cdot)$ represents an activation function. As shown in FIG. 6(a), the adjacency matrix $A^1$ of the first GCN is constructed as follows: if a j-th joint is one of ancestor joints of an i-th joint, then $A_{ij}^1 = 1$; and otherwise, $A_{ij}^1 = 0$, where $A_{ij}^1$ represents an element located in an i-th row and a j-th column in the adjacency matrix $A^1$.

Specifically, the second GCN may be expressed by Eq. (5):

$$Z_{out} = \sigma(\hat{A}^2 Z_{in} W^2) \quad (5)$$

Among them, $Z_{in}$ and $Z_{out}$ are input and output features, $\hat{A}^2$ is a normalized adjacency matrix, $W^2$ is a weight of a learnable convolution kernel, and $\sigma(\cdot)$ represents an activation function. As shown in FIG. 6(b), the adjacency matrix $A^2$ of the second GCN is constructed as follows: if a i-th joint and an j-th joint are connected or i=j, then $A_{ij}^2 = 1$; and otherwise $A_{ij}^2 = 0$, where $A_{ij}^2$ represents an element located in an i-th row and a j-th column in the adjacency matrix $A^2$.

Specifically, the third GCN may be expressed by Eq. (6):

$$Z_{out} = \sigma(\hat{A}^3 Z_{in} W^3) \quad (6)$$

Among them, $Z_{in}$ and $Z_{out}$ are input and output features, $\hat{A}^3$ is a normalized adjacency matrix, $W^3$ is a weight of a learnable convolution kernel, and $\sigma(\cdot)$ represents an activation function. As shown in FIG. 6(c), the adjacency matrix $A^3$ of the third GCN is constructed as follows: if a j-th joint is a parent or child joint of an i-th joint or i=j, then $A_{ij}^3 = 1$; and otherwise, $A_{ij}^3 = 0$, where $A_{ij}^3$ represents an element located in an i-th row and a j-th column in the adjacency matrix $A^3$.

S5: Estimate, by a third neural network, a pose parameter of the human body model based on the refined rotation features.

Figure 7:
FIG. 7 shows reconstruction results obtained by inputting human body images according to an embodiment of the present invention.

FIG. 7 shows reconstruction results obtained by inputting human body images according to an embodiment of the present invention. The upper 5 pictures are input human body images, and the lower 5 pictures respectively correspond to the human body images directly above, which are the reconstruction results of the 3D human body model of the 5 human body images. FIG. 7 shows that this embodiment has a desirable performance in dealing with human body pose changes, clothing differences and serious occlusion in real scenes.

In summary, the reconstruction method of a 3D human body model proposed in this embodiment has the following three advantages, namely, the dense UVI map as an intermediate expression, the global and local decoupling design, and the position-aided rotation feature refinement strategy. Compared with other reconstruction methods, the reconstruction method of the present invention is robust and accurate in dealing with the changes caused by human body pose, clothing, lighting and occlusion in the images in real scenes.

In an optional embodiment, the reconstruction method further includes the following step in addition to steps S1 to S5.

S6: Reconstruct the 3D human body model based on the camera parameter, and the shape parameter of the human body model and the pose parameter of the human body model. These steps are described in order in the above embodiments. However, those skilled in the art may understand that, in order to achieve the effects of these embodiments, different steps may not be necessarily executed in such an order, but may be executed simultaneously (in parallel) or in a reversed order. These simple changes should fall within the protection scope of the present invention.

Based on the above embodiment of the reconstruction method of a 3D human body model, the present invention further provides an embodiment of a storage device. The storage device stores a plurality of programs, where the programs are configured to be loaded and executed by a processor to implement the above reconstruction method of a 3D human body model.

The present invention further provides a control device, including a processor and a memory, where, the processor is configured to load a program, and the memory is configured to store the program; and the memory is configured to be loaded and executed by the processor to implement the above reconstruction method of a 3D human body model.

Those skilled in the art should realize that the steps of the methods described in the embodiments of the present invention can be implemented with electronic hardware, computer software, or a combination thereof. In order to clearly describe the interchangeability between the hardware and the software, compositions and steps of each example have been generally described according to functions in the foregoing descriptions. Whether the functions are performed by electronic hardware or software depends on particular applications and design constraints of the technical solutions. Those skilled in the art may use different methods to implement the described functions for each specific application, but such implementation should not be considered to be beyond the scope of the present invention.

The technical solutions of the present invention are described with reference to the preferred implementations and drawings. It is apparent that those skilled in the art should easily understand that the protection scope of the present invention is not limited to these specific implementations. Those skilled in the art can make equivalent changes or substitutions to the relevant technical features without departing from the principles of the present invention, and the technical solutions derived by making these changes or substitutions should fall within the protection scope of the present invention.

What is claimed is:

1. A reconstruction method of a three-dimensional (3D) human body model, comprising:
  acquiring, by a pre-trained fully convolutional network (FCN) module, a global UVI map and a local UVI map of a body part according to a human body image;
  estimating, by a first neural network, a camera parameter and a shape parameter of the human body model based on the global UVI map;
  extracting, by a second neural network, rotation features of joints of a human body based on the local UVI map;
  refining, by using a position-aided feature refinement strategy, the rotation features of the joints of the human body to acquire refined rotation features; and
  estimating, by a third neural network, a pose parameter of the human body model based on the refined rotation features.

2. The reconstruction method of the 3D human body model according to claim 1, wherein the UVI map comprises a U coordinate map, a V coordinate map and an I index map;
  wherein, U coordinates and V coordinates respectively show coordinates of the 3D human body model in a U texture space and a V texture space, and an I index shows an index of each body part.

3. The reconstruction method of the 3D human body model according to claim 2, wherein the human body model is a parameterized deformation model, and the human body model comprises the shape parameter and the pose parameter;
  wherein, the shape parameter denotes shape information of the human body model, and the pose parameter denotes a rotation amount of each of the joints of the human body model relative to a parent joint.

4. The reconstruction method of the 3D human body model according to claim 1, wherein
  the FCN module comprises: a first FCN, a second FCN, a third FCN and a fourth FCN; and
  correspondingly, the step of acquiring, by the pre-trained FCN module, the global UVI map and the local UVI map of the body part according to the human body image comprises:
    extracting, by the first FCN, a global feature map based on the human body image;
    predicting, by the second FCN, the corresponding global UVI map based on the global feature map;
    generating, by the third FCN, a heat map of joint positions of the human body based on the global feature map to acquire the joint positions;
    calculating affine transformation parameters corresponding to the joints based on the joint positions;
    performing affine transformation on the global feature map based on the affine transformation parameters of the joints to acquire a local feature map of the joints; and
    predicting, by the fourth FCN, the corresponding local UVI map based on the local feature map.

5. The reconstruction method of the 3D human body model according to claim 4, wherein the step of calculating the affine transformation parameters corresponding to the joints based on the joint positions comprises: calculating the affine transformation parameters corresponding to the joints according to the following formulas:

$$s_k = \alpha \max(|j_{p(k)} - j_k|_2, |j_{p(k)} - j_{c(k)}|_2)$$

$$r_k = \cos^{-1} \frac{(j_{p(k)} - j_k) \cdot e_\perp}{|j_{p(k)} - j_k|_2}$$

$$c_k = j_k$$

wherein, affine transformation parameters of a k-th joint comprise: a scale parameter $s_k$, a rotation parameter $r_k$ and a translation parameter $c_k$; $\alpha$ represents a preset constant; $e_\perp$ represents a vertical downward unit vector; $j_k$ represents a position coordinate of the k-th joint; p(k) is used to return a parent joint index of the k-th joint; and c(k) is used to return a child joint index of the k-th joint.

6. The reconstruction method of the 3D human body model according to claim 5, wherein the human body model is a parameterized deformation model, and the human body model comprises the shape parameter and the pose parameter;
  wherein, the shape parameter denotes shape information of the human body model, and the pose parameter denotes a rotation amount of each of the joints of the human body model relative to a parent joint.

7. The reconstruction method of the 3D human body model according to claim 4, wherein the human body model is a parameterized deformation model, and the human body model comprises the shape parameter and the pose parameter;
  wherein, the shape parameter denotes shape information of the human body model, and the pose parameter denotes a rotation amount of each of the joints of the human body model relative to a parent joint.

8. The reconstruction method of the 3D human body model according to claim 1, wherein the step of refining, by using the position-aided feature refinement strategy, the rotation features of the joints of the human body to acquire the refined rotation features comprises:
  collecting, by a first graph convolutional network (GCN), the rotation features of the joints of the human body along a kinematic chain, and transforming the rotation features of the joints of the human body into a position feature space to acquire position features;

refining, by a second GCN, the position features based on spatial structure information between different joints to acquire refined position features; and collecting, by a third GCN, the refined position features, and transforming the refined position features into a rotation feature space to acquire the refined rotation features.

9. The reconstruction method of the 3D human body model according to claim 8, wherein during training, a neural network regresses position coordinates of the joints of the human body model from the position features and the refined position features, and regresses the pose parameter of the joints of the human body model from the rotation features and the refined rotation features.

10. The reconstruction method of the 3D human body model according to claim 9, wherein the human body model is a parameterized deformation model, and the human body model comprises the shape parameter and the pose parameter;

wherein, the shape parameter denotes shape information of the human body model, and the pose parameter denotes a rotation amount of each of the joints of the human body model relative to a parent joint.

11. The reconstruction method of the 3D human body model according to claim 8, wherein an adjacency matrix $A^1$ of the first GCN is constructed as follows:

when a j-th joint is one of ancestor joints of an i-th joint, $A_{ij}^1=1$; and otherwise, $A_{ij}^1=0$, wherein $A_{ij}^1$ represents an element located in an i-th row and a j-th column in the adjacency matrix $A^1$.

12. The reconstruction method of the 3D human body model according to claim 11, wherein the human body model is a parameterized deformation model, and the human body model comprises the shape parameter and the pose parameter;

wherein, the shape parameter denotes shape information of the human body model, and the pose parameter denotes a rotation amount of each of the joints of the human body model relative to a parent joint.

13. The reconstruction method of the 3D human body model according to claim 8, wherein an adjacency matrix $A^2$ of the second GCN is constructed as follows:

when an i-th joint and a j-th joint are connected or i=j, $A_{ij}^2=1$; and otherwise $A_{ij}^2=0$, wherein $A_{ij}^2$ represents an element located in an i-th row and a j-th column in the adjacency matrix $A^2$.

14. The reconstruction method of the 3D human body model according to claim 8, wherein an adjacency matrix $A^3$ of the third GCN is constructed as follows:

when a j-th joint is a parent or child joint of an i-th joint or i=j, $A_{ij}^3=1$; and otherwise, $A_{ij}^3=0$, wherein $A_{ij}^3$ represents an element located in an i-th row and a j-th column in the adjacency matrix $A^3$.

15. The reconstruction method of the 3D human body model according to claim 8, wherein the human body model is a parameterized deformation model, and the human body model comprises the shape parameter and the pose parameter;

wherein, the shape parameter denotes shape information of the human body model, and the pose parameter denotes a rotation amount of each of the joints of the human body model relative to a parent joint.

16. The reconstruction method of the 3D human body model according to claim 1, wherein the human body model is a parameterized deformation model, and the human body model comprises the shape parameter and the pose parameter;

wherein, the shape parameter denotes shape information of the human body model, and the pose parameter denotes a rotation amount of each of the joints of the human body model relative to a parent joint.

17. The reconstruction method of the 3D human body model according to claim 1, further comprising:

reconstructing the 3D human body model based on the camera parameter, and the shape parameter of the human body model and the pose parameter of the human body model.

18. The reconstruction method of the 3D human body model according to claim 1, wherein the human body model comprises a preset number of joints; and the second neural network comprises a preset number of branch networks, respectively corresponding to the preset number of joints; and each of the preset number of branch networks is used to extract a rotation feature of a corresponding joint.

19. A storage device, storing a plurality of programs, wherein the plurality of programs are configured to be loaded and executed by a processor to implement the reconstruction method of the 3D human body model according to claim 1.

20. A control device, comprising:

a processor configured to load a program; and a memory configured to store the program;

wherein, the program is configured to be loaded and executed by the processor to implement the reconstruction method of the 3D human body model according to claim 1.

* * * * *